United States Patent
Holler et al.

(10) Patent No.: US 9,727,355 B2
(45) Date of Patent: Aug. 8, 2017

(54) VIRTUAL HADOOP MANAGER

(71) Applicant: VMware, Inc., Palo Alto, CA (US)

(72) Inventors: Anne Holler, Los Altos, CA (US); Jayanth Gummaraju, San Francisco, CA (US); Kinshuk Govil, Los Altos, CA (US); Benjamin J. Corrie, San Francisco, CA (US); George Hicken, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 19 days.

(21) Appl. No.: 14/311,755

(22) Filed: Jun. 23, 2014

(65) Prior Publication Data
US 2015/0058843 A1 Feb. 26, 2015

Related U.S. Application Data

(60) Provisional application No. 61/869,521, filed on Aug. 23, 2013.

(51) Int. Cl.
*G06F 9/455* (2006.01)
*G06F 9/48* (2006.01)
*G06F 9/50* (2006.01)

(52) U.S. Cl.
CPC .......... *G06F 9/455* (2013.01); *G06F 9/45533* (2013.01); *G06F 9/45558* (2013.01); *G06F 9/48* (2013.01); *G06F 9/50* (2013.01); *G06F 9/5088* (2013.01); *G06F 2009/4557* (2013.01)

(58) Field of Classification Search
CPC .. G06F 9/455; G06F 9/45533; G06F 9/45558; G06F 9/48; G06F 9/50; G06F 9/5088

USPC ................................................. 718/1
See application file for complete search history.

(56) References Cited

U.S. PATENT DOCUMENTS

| | | | | |
|---|---|---|---|---|
| 7,747,422 B1 * | 6/2010 | Sisley | ..................... | G06F 17/50 703/13 |
| 7,827,358 B2 * | 11/2010 | Watson | ................... | G06F 9/485 711/100 |
| 8,171,140 B2 * | 5/2012 | Waldspurger | ......... | G06F 9/4881 709/203 |
| 8,260,840 B1 * | 9/2012 | Sirota | ................... | G06F 9/5061 370/216 |

(Continued)

OTHER PUBLICATIONS

Chen, Lijun et al., "Contention Control: A Game-Theoretic Approach," 2007, 46th IEEE Conference on Decision and Control, last retrieved from spot.colorado.edu/~lich1539/papers/Chen-2007-RAG-CDC.pdf on Sep. 30, 2015.*

(Continued)

*Primary Examiner* — Qing Chen
*Assistant Examiner* — Andrew M Lyons
(74) *Attorney, Agent, or Firm* — Patterson & Sheridan LLP (57) ABSTRACT

A distributed computing application is described that provides a highly elastic and multi-tenant platform for Hadoop applications and other workloads running in a virtualized environment. Multiple instances of a distributed computing framework, such as Hadoop, may be executed concurrently. A centralized manager detects when contention for computing resources, such as memory and CPU, causes tasks to run slower on VMs executing on a given host, and scales up or scales down a cluster based on the detected resource contention.

20 Claims, 6 Drawing Sheets

(56) References Cited

U.S. PATENT DOCUMENTS

| | | | | |
|---|---|---|---|---|
| 8,667,500 | B1* | 3/2014 | Ji | G06F 9/5077 |
| | | | | 718/102 |
| 8,719,415 | B1* | 5/2014 | Sirota | G06F 9/5061 |
| | | | | 709/221 |
| 8,843,933 | B1* | 9/2014 | Holler | G06F 9/45533 |
| | | | | 718/104 |
| 9,128,739 | B1* | 9/2015 | Juels | G06F 9/45533 |
| 2005/0050200 | A1 | 3/2005 | Mizoguchi | |
| 2006/0190482 | A1* | 8/2006 | Kishan | G06F 9/485 |
| 2009/0037367 | A1 | 2/2009 | Wein | |
| 2011/0055838 | A1* | 3/2011 | Moyes | G06F 9/4881 |
| | | | | 718/102 |
| 2011/0072138 | A1* | 3/2011 | Canturk | G06F 9/5011 |
| | | | | 709/226 |
| 2011/0099403 | A1 | 4/2011 | Miyata et al. | |
| 2011/0167421 | A1* | 7/2011 | Soundararajan | G06F 9/5077 |
| | | | | 718/1 |
| 2011/0225592 | A1* | 9/2011 | Goldin | G06F 11/3612 |
| | | | | 718/104 |
| 2011/0276690 | A1* | 11/2011 | Whitehouse | G06F 9/526 |
| | | | | 709/226 |
| 2012/0166624 | A1* | 6/2012 | Suit | G06F 9/5077 |
| | | | | 709/224 |
| 2012/0179882 | A1* | 7/2012 | Bernhard, III | G06F 9/5022 |
| | | | | 711/156 |
| 2013/0097321 | A1 | 4/2013 | Tumbde et al. | |
| 2013/0174149 | A1* | 7/2013 | Dasgupta | G06F 9/5077 |
| | | | | 718/1 |
| 2013/0198319 | A1* | 8/2013 | Shen | G06F 9/455 |
| | | | | 709/217 |
| 2013/0332936 | A1* | 12/2013 | Magee | G06F 9/50 |
| | | | | 718/104 |
| 2014/0019966 | A1* | 1/2014 | Neuse | G06F 9/5077 |
| | | | | 718/1 |
| 2014/0040474 | A1* | 2/2014 | Blagodurov | G06F 9/5088 |
| | | | | 709/226 |
| 2014/0047342 | A1* | 2/2014 | Breternitz | G06F 9/5061 |
| | | | | 715/735 |
| 2014/0058871 | A1* | 2/2014 | Marr | G06F 9/45533 |
| | | | | 705/26.1 |
| 2014/0059008 | A1* | 2/2014 | Parikh | G06F 17/30566 |
| | | | | 707/639 |
| 2014/0082614 | A1* | 3/2014 | Klein | G06F 9/45558 |
| | | | | 718/1 |
| 2014/0137104 | A1* | 5/2014 | Nelson | G06F 9/45558 |
| | | | | 718/1 |
| 2014/0245298 | A1* | 8/2014 | Zhou | G06F 9/455 |
| | | | | 718/1 |

OTHER PUBLICATIONS

Duke, "Moving average and exponential smoothing models," Feb. 1, 2001, last retrieved from people.duke.edu/~mau/411avg.htm on Sep. 29, 2015.*

Jorink, Arjan, "Interpreting esxtop Statistics," Mar. 26, 2010, last retrieved from www.jorink.nl/2010/03/interpreting-esxtop-statistics/ on Sep. 30, 2015.*

Kundu, Sajib, "Improving Resource Management in Virtualized Data Centers using Application Performance Models," Apr. 1, 2013, FIU Electronic Theses and Dissertations, Paper 874, last retrieved from http://digitalcommons.fiu.edu/etd/874 on Sep. 29, 2015.*

Sagi, Assaf, "Best Practices to Resolve Resource Contention in the Cloud," APMdigest, Oct. 18, 2012, last retrieved from http://apmdigest.com/best-practices-to-resolve-resource-contention-in-the-cloud on Sep. 28, 2015.*

StackExchange, "What do you call an average that does not include outliers?" Feb. 2, 2009, last retrieved from stats.stackexchange.com/questions/16198/what-do-you-call-an-averafe-that-does-not-include-outliers on Sep. 29, 2015.*

VMWare, "Understanding Memory Resource Management in VMWare ESX Server," 2009, last retrieved from www.vmware.com/files/pdf/perf-vsphere-memory_management.pdf on Sep. 30, 2015.*

Lowe, Scott, "Monitoring VMware vSphere Performance," Mastering VMWare vSphere 4, Chapter 12, pp. 519-554, Aug. 31, 2009.*

Mukherjee et al., "," 2013 IFIP/IEEE International Symposium on Integrated Network Management, pp. 294-302, May 27-31, 2013.*

NetApp, "Determining virtual machine contention," Feb. 20, 2013, last retrieved from https://library.netapp.com/ecmdocs/ECMP1154897/html/GUID54CC4464B03344F98C962452A48081EB.html on Apr. 14, 2017.*

NetApp, "Identifying the cause of the congested host," Feb. 20, 2013, last retrieved from https://library.netapp.com/ecmdocs/ECMP1154897/html/GUID4566C994AEC044E3A1F890083A0F05A5.html on Apr. 14, 2017.*

International Search Report and Written Opinion for Application No. PCT/US2014/045377, dated Sep. 18, 2014, 11 pgs.

Moulavi et al. "State-Space Feedback Control for Elastic Distributed Storage in a Cloud Environment", The Eighth International Conference on Autonomic and Autonomous Systems, Sep. 23, 2012, 10 pgs.

Australian Search Report dated Oct. 4, 2016 in related Australian Patent Application 2014309371.

Japanese Office Action dated Feb. 21, 2017 in related Japanese Patent Application No. 2016-524367 with English Translation (6 pages).

* cited by examiner

VIRTUAL HADOOP MANAGER

CROSS-REFERENCE TO RELATED APPLICATION(S)

This application claims the benefit of U.S. Provisional Patent Application No. 61/869,521, filed Aug. 23, 2013, the entire contents of which are incorporated by reference herein.

BACKGROUND

Distributed computing platforms, such as Hadoop or other MapReduce-related frameworks, include software that allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platforms typically utilize a distributed file system that can support input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

DETAILED DESCRIPTION

One or more embodiments disclosed herein provide methods, systems, and computer programs for enabling coexistence of multiple data frameworks (e.g., Hadoop clusters) with each other and with other workloads in a virtualized environment. A virtual Hadoop manager (VHM) determines if there is resource contention within the virtualized environment based on one or more metrics that have been identified as indicating resource contention, and proposes one or more remedial actions, such as shrinking or expanding a cluster. It has been determined that if resource content causes tasks to run slower on a virtual machine (VM), it may be desirable to not run tasks on that VM because doing so would create stragglers and laggard tasks. VMs in other hosts that do not have such resource contention may be better off running these tasks. Rather than re-create or change external schedulers, the virtual Hadoop manager is configured to react to the "ambient" information provided by the hosts, VMs, and nodes within the Hadoop clusters.

Figure 1:
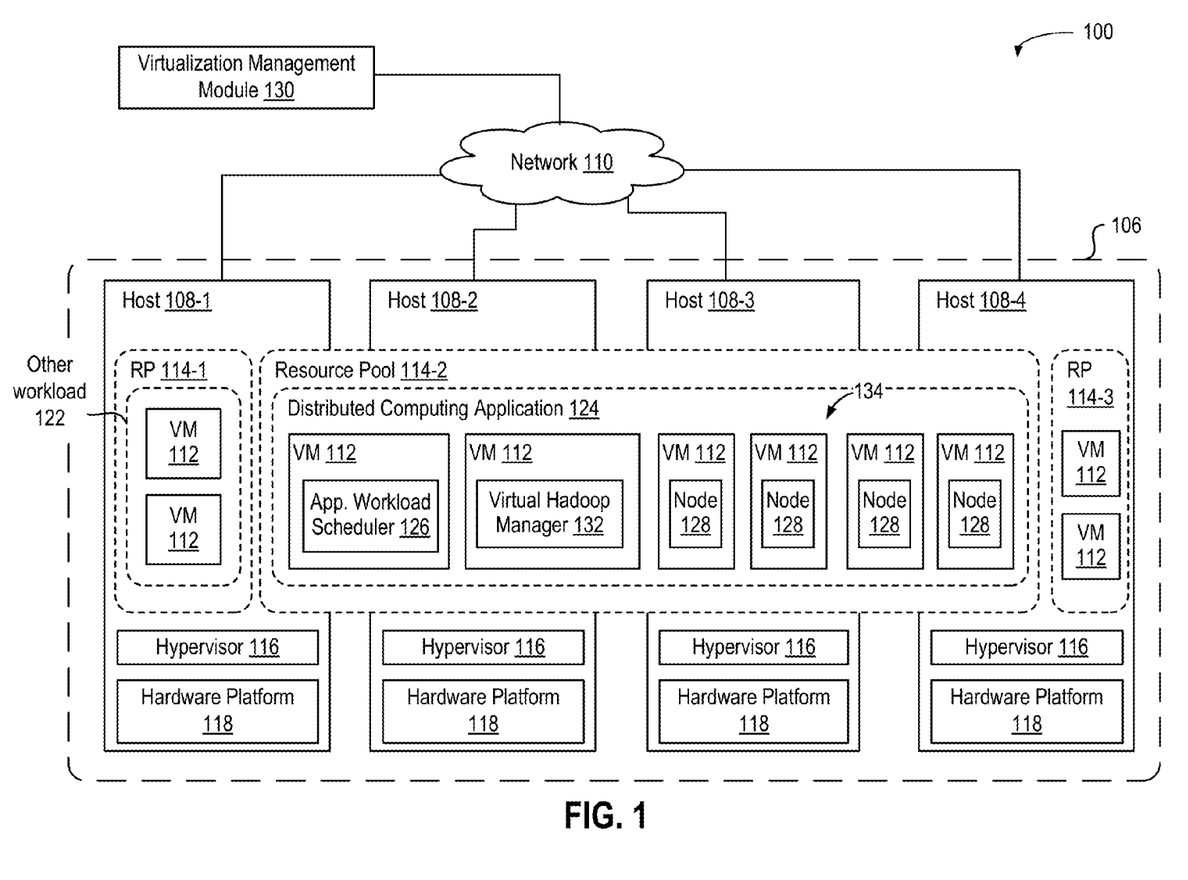
FIG. 1 is a block diagram that illustrates a virtualized computing system with which one or more embodiments of the present disclosure may be utilized.

FIG. 1 is a block diagram that illustrates a computing system 100 with which one or more embodiments of the present disclosure may be utilized. As illustrated, computing system 100 includes a host group 106 of host computers, identified as hosts 108-1, 108-2, 108-3, and 108-4, and referred to collectively as hosts 108. Each host 108 is configured to provide a virtualization layer that abstracts processor, memory, storage, and networking resources of a hardware platform 118 into multiple virtual machines (VMs) 112 that run concurrently on the same host 108. VMs 112 run on top of a software interface layer, referred to herein as a hypervisor 116, that enables sharing of the hardware resources of host 108 by the VMs 112. One example of hypervisor 116 that may be used in an embodiment described herein is a VMware ESXi hypervisor provided as part of the VMware vSphere solution made commercially available from VMware, Inc.

In one embodiment, VMs 112 are organized into a plurality of resource pools, identified as resource pool 114-1, 114-2, and 114-3, which logically partitions available resources of hardware platforms 118, such as CPU and memory. Resource pools 114 may be grouped into hierarchies; resource pools 114 provide resources to "child" resource pools and virtual machines. Resource pools 114 enable a system administrator to organize resources of computing system 100, isolate VMs and computing resources from one resource pool to another, abstract resources from the actual hosts 108 that contribute the resources, and manage sets of VMs 112 associated with a resource pool 114. For example, a system administrator may control the aggregate allocation of resources to the set of VMs 112 by changing settings on the VMs' enclosing resource pool 114.

As shown, VMs 112 of hosts 108 may be provisioned and used to execute a number of workloads (e.g., workloads 122) that deliver information technology services, including web services, database services, data processing services, and directory services. In one embodiment, one or more VMs 112 are configured to serve as a VM node 128 of a cluster 134 generated and managed by a distributed computing application 124 configured to elastically distribute its workload over a plurality of VMs that acts as nodes 128 of the distributed computing application. Distributed computing application 124 is configured to incorporate additional VMs or releasing unused VM nodes 128 from its cluster—thereby growing and shrinking its profile within computing system 100—based on a particular workload demand. VMs 112 executing as nodes 128 on host 108 are shown in greater detail in FIG. 2.

Figure 2:
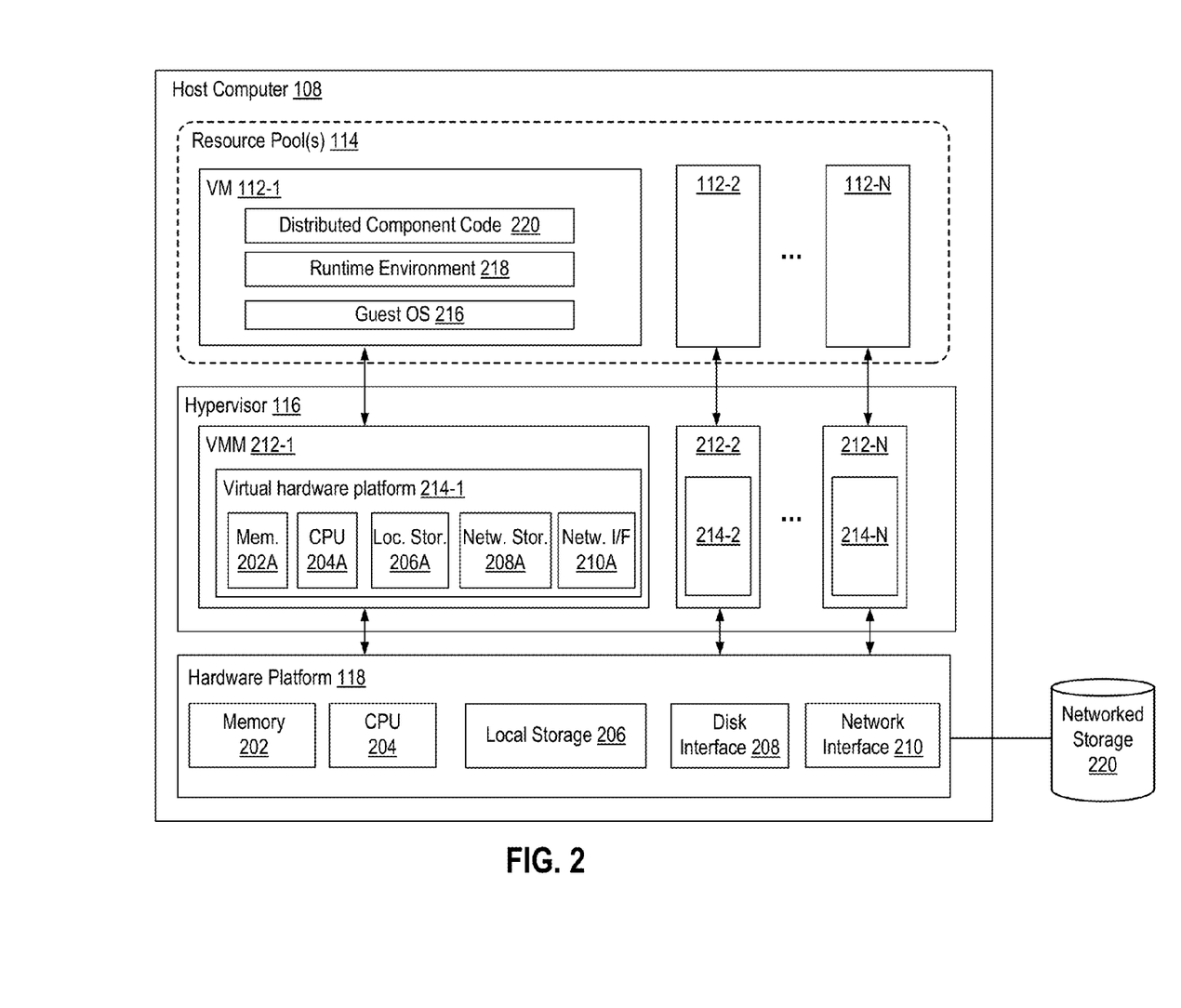
FIG. 2 is a block diagram that illustrates a host computer supporting one or more virtual machines, according to one embodiment of the present disclosure.

FIG. 2 is a block diagram that illustrates a host computer 108 supporting one or more virtual machines 112, according to one embodiment of the present disclosure. As shown, hardware platform 118 of each host 108 may include conventional components of a computing device, such as a memory 202, a processor 204, local storage 206, a disk interface 208, and a network interface 210. Processor 204 is configured to execute instructions, for example, executable instructions that perform one or more operations described herein and may be stored in memory 202 and in local storage 206. Memory 202 and local storage 206 are devices allowing information, such as executable instructions, cryptographic keys, virtual disks, configurations, and other data, to be stored and retrieved. Memory 202 may include, for example, one or more random access memory (RAM) modules; local storage 206 may include, for example, one or more hard disks, flash memory modules, solid state disks, and optical disks. Disk interface 208 enables host 108 to communicate with one or more network data storage systems that may, for example, store "virtual disks" that are accessed by VM nodes. Examples of disk interface 208 are a host bus adapter (HBA) that couples host 108 to a storage area network (SAN) or a network file system interface, depicted as networked storage 230. Network interface 210 enables host 108 to communicate with another device via a communication medium, such as network 110. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 108 by the virtual machines. Hypervisor 116 may run on top of the operating system of host 108 or directly on hardware components of host 108. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, local storage 206A, networked storage 208A, network interface 210A, etc.) that may, for example, function as an equivalent, conventional hardware architecture for its corresponding VM 112. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N. In the embodiment depicted in FIG. 2, each VM 112 includes a guest operating system (OS) 216 (e.g., Microsoft Windows, Linux) and one or more guest applications running on top of guest OS 216. In one embodiment, each VM 112 includes a runtime environment 218, such as a Java Virtual Machine (JVM), that supports execution of a distributed software component code 220 (e.g., Java code) for distributed computing application 124. For example, if distributed computing application 124 is a Hadoop application, a VM 112 may have a runtime environment 218 (e.g., JVM) that executes distributed software component code 220 implementing a workload scheduler function (sometimes referred to as "Job Tracker"), "Task Tracker" function, or "Name Node" function, "Data Node" function, described further below. Alternatively, each VM 112 may include distributed software component code 220 for distributed computing application 124 configured to run natively on top of guest OS 216.

As depicted in FIG. 1, computing system 100 includes a virtualization management module 130 that may communicate to the plurality of hosts 108 via network 110. In one embodiment, virtualization management module 130 is a computer program that resides and executes in a central server, which may reside in computing system 100, or alternatively, running as a VM in one of hosts 108. One example of a virtualization management module is the vCenter® Server product made available from VMware, Inc. Virtualization management module 130 is configured to carry out administrative tasks for the computing system 100, including managing hosts 108, managing VMs running within each host 108, provisioning VMs, migrating VMs from one host to another host, load balancing between hosts 108, creating resource pools 114 comprised of computing resources of hosts 108 and VMs 112, modifying resource pools 114 to allocate and de-allocate VMs and physical resources, and modifying configurations of resource pools 114. In one embodiment, virtualization management module 130 is configured to communicate with hosts 108 to collect performance data and generate performance metrics (e.g., counters, statistics) related to availability, status, and performance of hosts 108, VMs 112, and resource pools 114.

Virtualization management module 130 may be configured to provide a virtual environment scheduler functionality that balances load across system 100 by balancing the VMs across hosts 108 of the host group 106. For example, if the resource usage on one of the VMs in a resource pool drastically changes, the virtualization management module 130 moves around, or migrates, VMs among the physical hosts to optimize distribution of virtual machines across the hosts. Further, if the overall workload of all VMs decreases, the virtualization management module 130 may power down some of the physical hosts and consolidate the VMs across the remaining physical hosts. One example of a virtual environment scheduler is the VMware Distributed Resource Scheduler (DRS®) product made available from VMware, Inc.

In one embodiment, virtualization management module 130 is configured to adjust one or more resource controls associated with the VMs 112 and resource pools 114. Resource controls are configurations, attributes, and other settings that specify how hardware resources (e.g., memory 202, CPU 204, storage, network bandwidth) are allocated and utilized by VMs 112 and resource pools 114. In one embodiment, to manage how resources (e.g., CPU, memory, storage, network) are allocated to VMs 112, virtualization management module 130 modifies the resource controls for "reservation," "limit," and "shares" for one or more VMs 112, and the resource controls for "reservation," "limit," and "shares" assigned to one or more resource pools 114, and performs virtual environment scheduling operations described above based on the modified resource controls. In another embodiment, virtualization management module 130 may issue commands to power on, power off, clone, deploy, one or more VMs 112 executing on a particular host 108 to manage resources across system 100. In one example, compute VMs may be placed in a resource pool 114 having a "low" shares setting indicating a lower priority such that any resource contention is first seen by these compute VMs before being seen by other, more critical VMs (e.g., master VMs) in other resource pools.

In one embodiment, distributed computing application 124 includes an application workload scheduler 126 (e.g., executing in a VM 112) configured to manage execution of workloads running one or more within VM nodes 128 associated with the distributed computing application. During operation, application workload scheduler 126 may query VM nodes 128 allocated to the distributed computing application to determine their status and the availability of resources for processing additional workloads. For example, application workload scheduler 126 may query VMs 112-3 to 112-9 allocated to the distributed computing application to determine if the VMs are up, and if they are up, how much RAM may be allocated from each VM for executing a portion of the workload performed by the distributed computing application as a whole.

Figure 3:
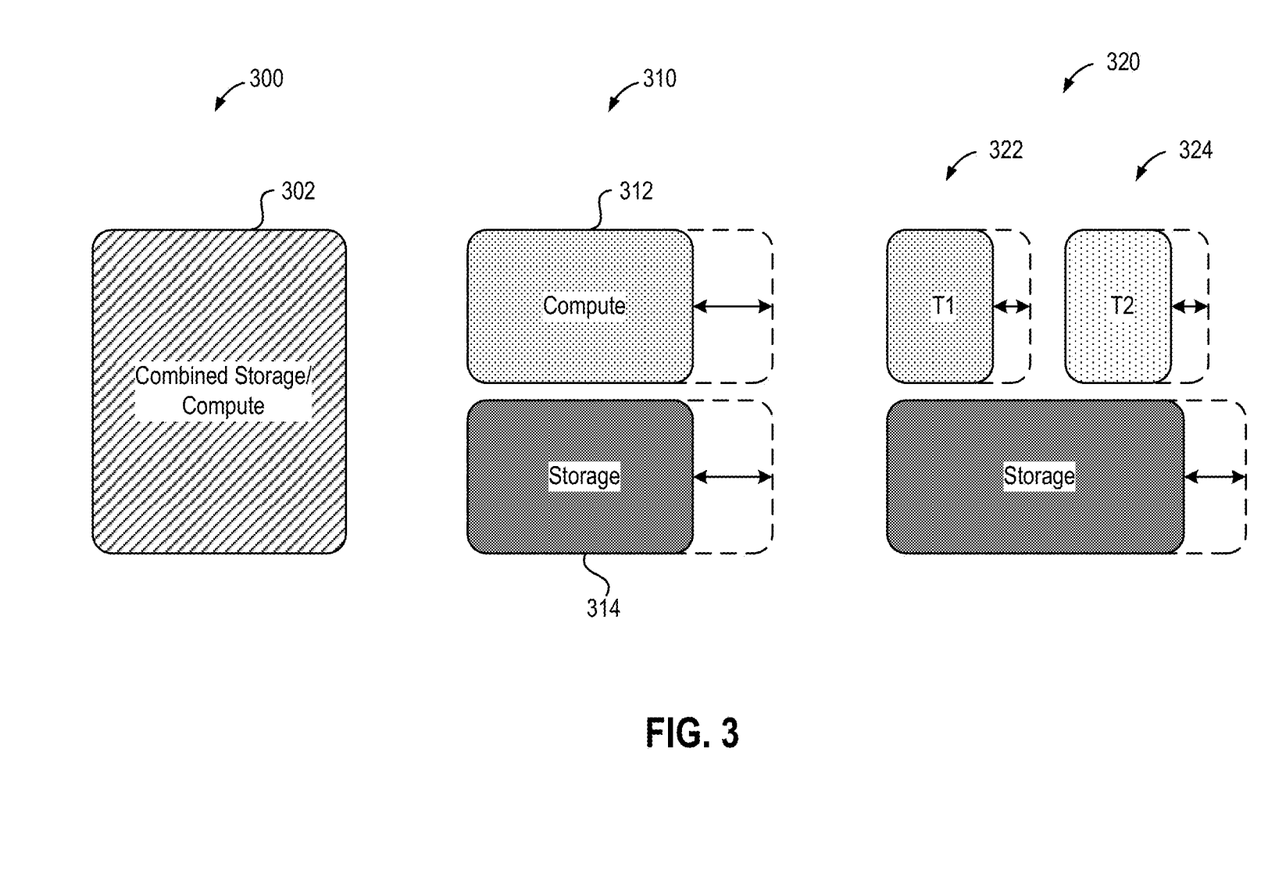
FIG. 3 is a block diagram that depicts various embodiments of a node in a Hadoop cluster.

Embodiments of the present disclosure include a virtual Hadoop manager 132 configured to enable elastic distributed computing on a virtualized environment, such as computing system 100. Virtual Hadoop manager 132 is configured to communicate (e.g., via an API call) with virtualization management module 130 to shrink or expand compute clusters based on performance metrics associated with computing resources of system 100 and on performance metrics associated with the compute clusters. While virtual Hadoop manager 132 is depicted in FIGS. 1 and 3 as a separate component that resides and executes on a VM 112 running within one of hosts 108, it is appreciated that the virtual Hadoop manager 132 may alternatively reside in any one of the computing devices of the virtualized computing system 100, for example, such as the same central server where the virtualization management module 130 resides. Further, while the Figures depict a single virtual Hadoop manager for all hosts 108, it is noted that embodiments of the present disclosure may be scaled efficiently. That is, as the number of hosts increase within computing system 100, a distributed cluster of VHMs 132 may be used to manage independent sets of hosts. Additionally, while virtual Hadoop manager 132 is described in detail for use with the Hadoop framework, it is noted VHM 132 is configured to be data framework-agnostic, i.e., and may be used with other frameworks not limited to Hadoop. For example, VHM 132 may be used with distributed database frameworks, such as HBase, or an in-memory frameworks, such as Impala.

FIG. 3 is a block diagram that depicts various embodiments of a node (e.g., node 128) in a Hadoop cluster, according to one or more embodiments of the present disclosure. Various schemes for compute-data separation are depicted. Under one scheme 300, each node 302 (i.e., executing on VM 112) may include combined storage and compute nodes on that node 302. For example, each node 302 may have one Task Tracker and one Data node executing thereon. It has been determined that in some cases, the VM lifecycle is determined by the Data Node, and such schemes may have limited elasticity, and may be limited to Hadoop multi-tenancy.

Under scheme 310, storage nodes 314 are separated from compute nodes 312 such that compute nodes 312 and storage nodes 314 may be executing on separate VMs. In such embodiments, compute nodes 312 may be configured as elastic compute nodes. Under scheme 310, shared workloads are enabled (i.e., where different workloads can be executing in a Hadoop cluster), thereby raising utilization of the computing system.

Under scheme 320, computing system 100 may include separate virtual clusters per tenant. As shown in FIG. 3, separate compute tenants 322, 324 (labeled as "T1 "and "T2 ") may be executing within computing system 100. Such embodiments advantageously provide stronger VM-grade security and resource isolation, and also enable deployment of multiple Hadoop runtime versions, or deployment of various types of frameworks besides and including Hadoop. For example, one cluster of a deployed framework that is a test version can be deployed in the same computing system as another cluster of a deployed framework that is a production version of Hadoop. One embodiment of computing system 100 deploys separate compute clusters for different tenants sharing a same storage layer (e.g., Hadoop Distributed File System, or HDFS). According to one embodiment, compute nodes may be commissioned or decommissioned according to priority and available resources. An example architecture using scheme 320 is depicted in greater detail in FIG. 4.

Example Elastic Hadoop Application with Multi-Tenancy

Figure 4:
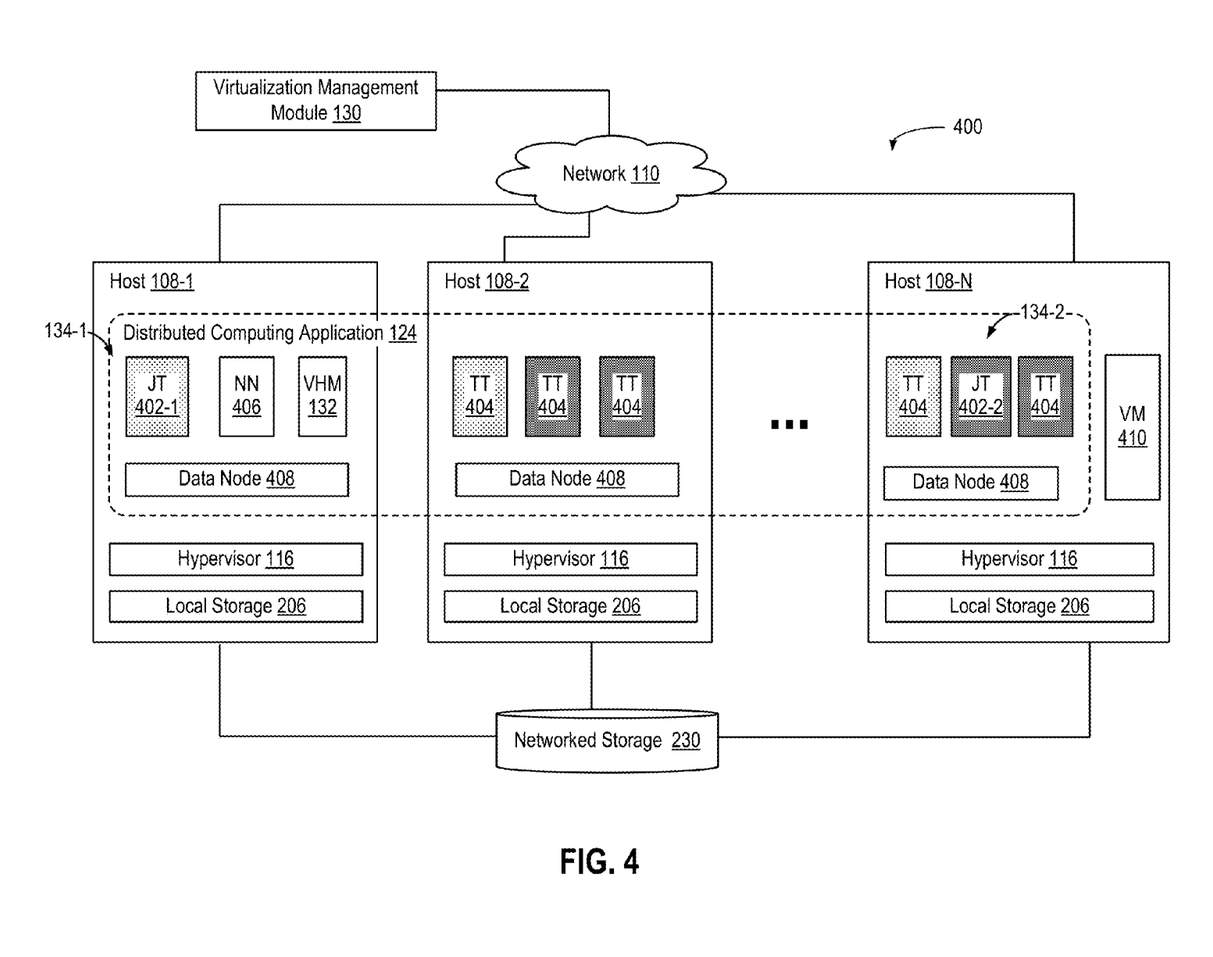
FIG. 4 is a block diagram that illustrates a virtualized computing system having a virtual Hadoop manager configured to multiple virtual clusters of distributed computing, according to one embodiment of the present disclosure.

FIG. 4 is a block diagram that illustrates a virtualized computing system 400 having a virtual Hadoop manager 132 configured to multiple virtual clusters 134-1 and 134-2 (collectively referred to as clusters 134) of distributed computing, according to one embodiment of the present disclosure. It should be recognized that virtualized computing system 400 may include other non-Hadoop related VMs that are executing other non-Hadoop related workloads within hosts 108, as represented by VM 410 executing on host 108-N. While distributed computing application 124 is depicted as a single entity, it should be recognized that virtual clusters 134 may be of different versions of a same distributed computing application or different distributed computing frameworks altogether.

In the embodiment shown in FIG. 3, distributed computing application 124 is a Hadoop application configured to process a large set of data using a distributed set of workload nodes (e.g., VMs 112) allocated to the Hadoop application. It should be recognized that alternative architectures for a Hadoop application (such as YARN) may be utilized with the techniques described herein, and other distributed computing applications, such as web applications having a front end scheduler or large scalable database system (e.g., MongoDB, Apache Cassandra), may be configured and utilized according to the techniques provided herein.

Each Hadoop cluster 134 includes at least one Job Tracker 402 (e.g., executing on a VM, not shown) which accepts jobs from clients and schedules corresponding workloads for execution on a plurality of slave nodes that are part of cluster 134. Each Hadoop cluster 134 includes a plurality of Task Trackers 404 (e.g., executing on a VM), which are worker nodes that carries out requested tasks (e.g., map tasks, reduce tasks) provided by Job Tracker 402. In one embodiment, each Task Tracker 404 is configured to run one or more tasks in one or more available "slots". In one example, each slot may be implemented as an instance of a runtime environment (e.g., Java Virtual Machine) executing distributed software component code (e.g., code 220) for completing a single task. As such, in some embodiments, each Track Tracker 404 may execute multiple instances of the runtime environment to execute in parallel multiple tasks assigned to the task tracker by Job tracker 402.

As shown in FIG. 4, a first Hadoop cluster 134-1 may have a set of Job Tracker 402-1 and a plurality of compute nodes (Task Trackers 404) which are separate from the set of job tracker 402-2 and task tracker nodes 404 for a second Hadoop cluster 134-2, as depicted by different fill patterns, but are sharing hardware resources of hosts 108.

In one embodiment, Hadoop clusters 134-1 and 134-2 may share a single data layer comprised of at least one Name Node 406 and a plurality of Data Nodes 408. Each Data Node 408 (e.g., executing as a VM) stores a portion of data used by the Hadoop clusters in storage, such as a local data store (e.g., local storage 206) and/or networked storage 230, available to the host 108 on which the data node executes. Name Node 406 tracks where the distributed portions of data are located among the distributed Data Nodes 408 of the Hadoop application (e.g., local storage 206 or networked storage 320).

Figure 5:
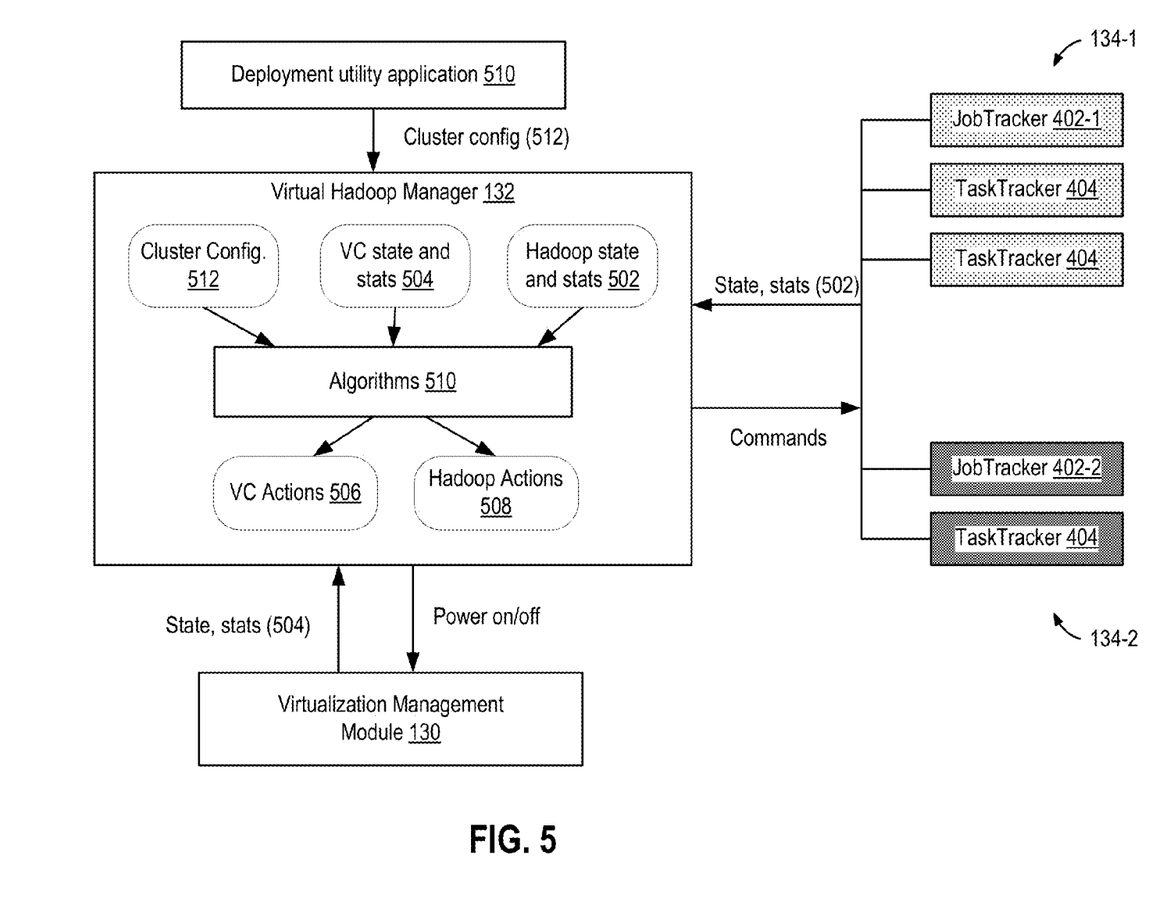
FIG. 5 is a block diagram depicting virtual Hadoop manager (VHM) in greater detail, according to one embodiment of the present disclosure.

FIG. 5 is a block diagram depicting virtual Hadoop manager (VHM) 132 in greater detail, according to one embodiment of the present disclosure. VHM 132 is configured to coordinate with virtualization management module 130 and job trackers 402 to elastically scale the Hadoop clusters. In one embodiment, VHM 132 is configured to expand or shrink clusters 134 based on ambient data provided by virtualization management module 130 and distributed computing application 124 (e.g., via job trackers 402). Ambient data includes resource-related metrics and framework-related metrics described in greater detail below. In some embodiments, VHM 132 expands a cluster 134 when VHM 132 determine there is work to be performed and determines there is no contention for resources within virtualized computing system 100. In some embodiments, VHM 132 shrinks a cluster 134 when VHM 132 determines there is contention for resources within virtualized computing system 100. Embodiments of the present disclosure advantageously provide predictive scaling for customer expectations, ease of test, and improved resource utilization.

VHM 132 uses contention detection as an input to a scaling response. As described in greater detail below, contention of resources reflects a user's resource control settings (e.g., "reservation", "limit," and "shares" settings) and workload demands. VHM 132 may act as an extension to the virtual environment scheduler functionality (i.e., DRS) provided by virtualization management module 130 for distributed computing applications spanning multiple VMs. VHM 132 acts as a glue between virtualization management module 130 and an application scheduler such as Job tracker 402. VHM 132 may be configured to penalize a few VMs heavily (i.e., disproportionately) rather than all VMs lightly (i.e., uniformly) while allocating resources. VHM 132 may be configured to react only if there is true contention (i.e., if a specific resource that is actively being used is being deprived) causing increased job execution time and in a timely manner (i.e., a reaction too slow causes stragglers or task errors, and a reaction that is too fast may be reacting to transients). VHM 132 may apply hysteresis and other control theory concepts, such as transient windows and thresholds, feedback from previous actions, to guide decisions regarding scaling a cluster.

In operation, VHM 132 collects information 502, 504 from virtualization management module 130 (e.g., vCenter) and Hadoop clusters 134 periodically, for example, at 20-second intervals. As shown in FIG. 5, information 504 from virtualization management module 130 may specify the state of and statistics about the underlying virtualized infrastructure upon which the Hadoop clusters run. In some embodiments, information 504, also referred to as resource-related metrics, may include VM configurations and resource control settings about VMs 112, e.g., CPU and memory allocations. In some embodiments, information 504 may include performance metrics such as host-level and guest-level memory, CPU, network, and storage performance metrics. Information 502 from Hadoop clusters 134 (e.g., reported by JobTrackers 402) may specify the application-level state of and statistics about the distributed computing application clusters 134. In some embodiments, information 502, also herein referred to cluster-related, framework-related, or Hadoop-related metrics, may include state information, such as the amount of jobs or tasks pending or currently being performed, the availability of slots for performing jobs, and errors and other job state information, and statistics and performance metrics related to the slots used, amount of pending work queued, and other statistics.

In one or more embodiments, VHM 132 is configured to weed out transient data, such as temporary spikes in resource consumption, by maintaining moving averages or medians of various metrics (e.g., collected from information 502, 504) over a time window. VHM 132 may be configured to discard any collected metrics having a value determined to be anomalous based on the moving averages and medians.

In one embodiment, VHM 132 is configured to check for resource contention and perform one or more actions on a periodic basis, referred to herein as "action cycles." For example, VHM 132 make shrinking and expansion decisions once per action cycle, for example, every 300 seconds. VHM 132 analyzes information 502, 504 using one or more algorithms 510 and generates events for shrinking and expansion, while weeding out transients. In one embodiment, algorithms 510 include a control-theory-based algorithm where the effects of shrinking and expansion decisions are fed back into the algorithm in the following action cycle. In some embodiments, VHM 132 makes a determination regarding resource contention and shrinking/expansion based on current metrics, as well as historical metrics. It is understood that the decisions (e.g., shrink, expand) made by VHM 132 may cause various metrics (e.g., CPU usage, memory usage, number of pending jobs, etc.) to change over a given time period. These changed metrics may be fed back into algorithms 510 to make new decisions for the next action cycle.

VHM 132 may use an event queue to consolidate and dispatch events. The event queue enables VHM 132 to handle a manual mode of operation where events are queued until manually approved and dispatched by a user (e.g., system administration), as well as handle an automatic mode of operation which automatically dispatches events and invokes the appropriate cluster for action. The manual/auto mode of operation, as well as other cluster configurations 412, can be specified by a deployment utility application 510 (e.g., Project Serengeti made available by VMware, Inc.).

The actions invoked by VHM 132 include virtualization-related actions 506, which are embodied by commands issued to virtualization management module 130 (e.g., to power on/off VMs), and Hadoop actions 508 which are embodied by commands issued to Hadoop clusters 134 (e.g., to decommission or re-commission compute nodes).

In one embodiment, algorithms 510 of VHM 132 may include one or more cluster scale strategists which make cluster-specific decisions. That is, each Hadoop cluster 134 may have an instance of a cluster scale strategist that analyzes generated events and decides a course of action on all hosts for that particular Hadoop cluster 134. The cluster-scale strategist may make decisions in a "selfish" approach wherein other non-associated clusters do not matter from the perspective of that cluster scale strategist. VHM 132 may include an arbitrator module that approves or denies cluster requests, to avoid clusters from trampling on each other.

Figure 6:
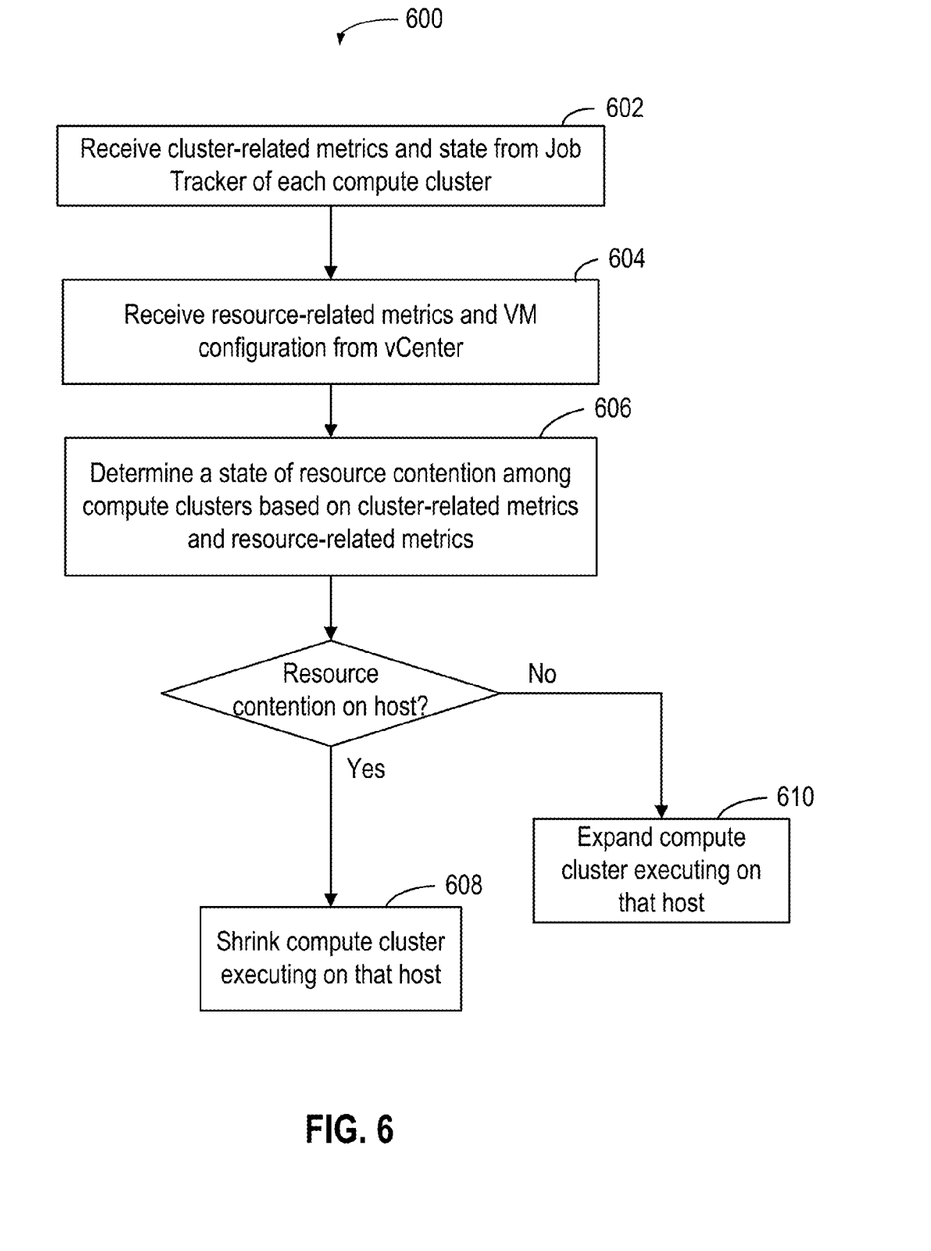
FIG. 6 is a flow diagram that illustrates steps for a method for elastic scalability of a multi-tenant distributed computing application within a virtualized environment, according to an embodiment of the present disclosure.

FIG. 6 is a flow diagram that illustrates steps for a method 600 for elastic scalability of a multi-tenant distributed computing application within a virtualized environment, according to an embodiment of the present disclosure. It should be recognized that, even though the method is described in conjunction with the system of FIGS. 1 and 3, any system configured to perform the method steps is within the scope of embodiments of the disclosure.

At step 602, VHM 132 receives cluster-related metrics (e.g., information 502) from a plurality of compute clusters 134 executing in a virtualized computing environment. VHM 132 may receive "global" statistics from Job Trackers 402 of each compute cluster 134, as well as "local" statistics from Task Trackers 404 of each compute cluster 134. Examples of cluster-related metrics may include statistics that indicate: a number of alive compute nodes in a compute cluster ("alive_nodes"), a number of task failures in a compute cluster ("task_failures"), a number of waiting Map tasks ("waiting_maps"), a number of waiting Reduce tasks ("waiting_reduces"), a number of Map slots being used in a particular task tracker 404 or all task trackers in aggregate ("map slots_used"), a maximum number of Map slots in a particular task tracker 404 or all task trackers in aggregate ("max_map_slots"), a number of Reduce slots being used in a particular task tracker 404 or all task trackers in aggregate ("reduce_slots_used"), and a maximum number of Reduce slots in a particular task tracker 404 or all task trackers in aggregate ("max_reduce_slots"), although other metrics may be used.

At step 604, VHM 132 receives resource-related metrics (e.g., information 504) associated with performance of the virtualized computing environment. VHM 132 may receive "host-level" statistics that represent performance of the underlying physical computing resources of a host 108. VHM 132 may also receive "guest-level" statistics that provide statistics of activity within a given VM 112 as well as runtime environments 218 (i.e., JVMs) that run instances of Job Trackers, Task Trackers, etc., for example as provided by a JVM monitoring agent. Resource-related metrics may include memory-related metrics and CPU-related metrics related to performance of memory 202 and CPU 204, respectively. Storage and network related metrics may also be used.

Examples of resource-related metrics include statistics that indicate: "Active Memory" metrics, which indicate an amount of memory that is actively used, as estimated by a hypervisor based on the number of machine page numbers (MPNs) actively being used in a particular VM; "Granted Memory" metrics, which indicate an amount of machine memory or "physical" memory granted to a particular VM based on a number of MPNs granted to the particular VM; "Consumed Memory" metrics, which indicate an amount of guest physical memory consumed by a particular VM based on a number of MPNs (excluding shared) being used by the VM (includes active/inactive MPNs); "Memory Ballooning" metrics, including a balloon target size that indicates an amount of guest physical memory that is currently reclaimed from a VM through ballooning; "Host Swap" metrics, including a target size for a VM swap file that indicates an amount of memory available for swapping; CPU Ready metrics that indicate a percentage of time (or cycles of time) that the virtual machine was ready, but could not get scheduled to run on the physical CPU; CPU Usage metrics that indicate amount of actively used virtual CPU, as a percentage of total available CPU; CPU Overlap metrics that indicate the amount of time the VM was interrupted to perform system services on behalf of that virtual machine or other virtual machines; and other metrics.

At step 606, VHM 132 determines whether a state of resource contention exists among the plurality of compute clusters for computing resources of the virtualized computing environment based on the received cluster-related metrics and resource-related metrics. VHM 132 may check for resource contention and perform one or more actions on a periodic basis, for example, on an action cycle of 300 seconds. VHM 132 may use a variety of algorithms 510 to make this determination. For example, VHM 132 can weigh factors that suggest resource contention exists against factors that suggest resource contention does not exist, or make a determination based on a threshold level of certainty using the factors. In one embodiment, VHM 132 uses an identified combination of cluster-related metrics and resource-related metrics which indicate resource contention. It should be recognized that resource contention may be identified on a per-VM basis, as well as on a per-host basis using aggregated versions of the metrics described above.

To determine a state of resource contention, VHM 132 may use a number of factors based on "shrinking-related" metrics. VHM 132 may determine that one or more CPUs 204 of a particular host 108 are being deprived from a particular compute cluster 134 using a CPU Ready metric from resource-related metrics. As discussed above, CPU Ready indicates an amount of time that a virtual CPU 204A is ready to run, but cannot be scheduled on a physical CPU 204. It has been determined memory contention can start with memory ballooning which then leads to host swapping. As such, VHM 132 may further determine that memory 202 of a particular host is being deprived from a particular compute cluster using Active Memory, Granted Memory, Memory Ballooning, and Host Swap metrics from resource-related metrics. It has been determined that errors in tasks or jobs may occur in memory contended scenarios because, for example, a task may have insufficient resources to report back or check in via heartbeat within a given time limit, thereby raising a error. As such, VHM 132 may determine that one or more task tracker nodes 404 within a compute cluster 134 are reported as dead or faulty using an Alive Nodes and Task Failures metrics from cluster-related metrics.

To determine that a state of resource contention does not exist, VHM 132 may use a number of factors based on "expansion-related" metrics that may suggest there is no resource contention within the virtualized computing system. VHM 132 may determine that jobs are present in a particular computer cluster using a Waiting Maps and Waiting Reduce metrics from cluster-related metrics. VHM 132 may determine there is high slot usage within a particular compute cluster, using Map Slots Used, Max Maps Slots, Reduce Slots Used, Max Reduce Slots metrics from cluster-related metrics. VHM 132 may determine there is no imminent contention in a particular host using CPU Ready metrics and Memory Ballooning metrics. In some cases where metrics are not available from a compute cluster 134, i.e., Hadoop, VHM 132 may identify non-idle VMs 112 using CPU Usage and Active Memory Usage metrics from resource-related metrics.

In one embodiment, VHM 132 may declare resource contention if an amount of memory reclamation from a guest VM exceeds an amount of unused memory in the guest VM. The amount of unused memory in a guest may be determined based on a difference between Granted Memory and Active Memory (i.e., [Granted−Active]). It has been determined that, in many cases, Active Memory tracks Granted Memory in memory-intensive environments, i.e., when contention for memory resources occurs. In some cases, Active Memory may be projected as a certain percentage of Granted Memory. The amount of memory reclamation from the guest VM may be determined based on the balloon target and swap target for a given VM. It has been determined that the balloon target suggests or translates to an amount of memory sharing and ballooning, and the swap target suggests or translates to an amount of memory compression and swapping occurring in a host. In some embodiments, VHM 132 may refrain from action if memory contention can be satisfied without affecting Active Memory usage. That is, in some embodiments, VHM 132 may act (e.g., shrink cluster) if Active Memory needs to be reduced to handle contention. In one embodiment, VHM 132 may use a "second-order" metric that are weighed less importantly than "first-order" metrics described above, such as the Memory Consumed metric.

In another embodiment, VHM 132 may declare resource contention based on CPU Ready and CPU Overlap metrics from resource-related metrics. It has been determined that the CPU Ready metric may measure contention in a given host due to other virtual CPUs supported by that host, and that the CPU Overlap metric may measure contention due to other factors, such as interrupts, etc. As "secondary" metrics, VHM 132 may use a CPU Demand metric that captures "stolen" cycles due to Ready, Overlap, power management, and HyperThreading features. In some embodiments, VHM 132 may be configured to handle transients based on the CPU Ready metric. For example, Hadoop jobs having small tasks can cause short-lived spikes and transients as multiple JVMs are frequently started at the same time. In some embodiments, VHM 132 may be configured to detect when memory contention leads to coordinated CPU Ready spikes.

In some embodiments, VHM 132 may factor in whether a VM has been recently powered on as basis for the determination of resource contention. It has been determined that powering on a new VM, such as during an expand event, may raise issues in determining resource contention. For example, powering on a new VM may cause "Active Memory" to be set to 75% of the memory configuration of the new VM, and memory reclamation may potentially be triggered in VMs of the sibling resource pool 114. By observing VMs at boot time and when Hadoop jobs finished, it was been determined that it may take several minutes (e.g., approximately 10 minutes) for a newly powered-on VM to get back to "zero-level". In some cases, Granted Memory might not increase with Active Memory of a powered-on VM because small memory pages might have been used during the boot process. In other cases, Granted Memory may increase immediately after power on because large memory pages were used during the boot process. Accordingly, in some embodiments, VHM 132 may disregard or de-emphasize performance metrics of a newly powered-on VM for an initial period of time after power-on, when making a resource contention determination. Further, VHM 132 may ignore effects on other VMs (e.g., sibling VMs or "hot-spare" VMs) due to reclamation triggered by the power on. The initial period of time may be pre-determined, and may be specified in terms of multiples of the action cycle (e.g., multiples of 300 seconds).

In some embodiments, VHM 132 may determine there is no resource contention according to cluster-specific metrics, even though resource-related metrics might suggest otherwise. For example, in some Hadoop clusters that have explicit Map and Reduce slots in a Task Tracker VM (e.g., two fixed Map slots and two fixed Reduce slots per Task Tracker), different VMs appear busier at different times during a MapReduce job depending on whether the Reduce slots in a node are being used. One VM might need more resources for executing Reduce tasks, and other VMs might be done executing their Map tasks already. This scenario could cause ballooning in the idle Map-executing VMs, which may appear as resource contention using memory ballooning metrics as described above. However, it has been determined that this may not be true resource contention, but rather is a reallocation of resources. Accordingly, VHM 132 may use cluster-specific metrics, such as Map Slots Used, Max Maps Slots, Reduce Slots Used, Max Reduce Slots metrics, together with an understanding of a particular Hadoop framework to determine there is no true resource contention in a particular host.

At step 608, responsive to determining resource contention exists on a particular host, VHM 132 shrinks at least one of the plurality of compute clusters executing on that host. VHM 132 may select one of VMs 112 executing as a node for the compute cluster (e.g., a Task Tracker node), and which is undergoing resource contention (e.g., memory contention, CPU contention). In some embodiments, VHM 132 may issue a Hadoop command to decommission the Task Tracker 404 associated with that selected VM, which results in Job Tracker 402 scheduling the tasks on other Task Trackers and cease acceptance of new tasks on that selected VM. In some embodiments, VHM 132 may issue a power off command to virtualization management module 130 to power off the selected VM.

By observing memory and CPU intensive environments, it has been determined that memory may be much slower to react than CPU resources, on the order of many seconds to minutes versus a few seconds. Memory pressure often induces ballooning, which could result in higher CPU usage. Memory contention causes tasks and jobs to fail more easily than CPU contention. It has been determined that removing memory-contended VMs could immediately reduce ready time for other VMs. Similarly, by removing CPU-contended VMs, memory-contended VMs may take a while to recover. Accordingly, when selecting a VM to shrink, VHM 132 may give a higher preference to memory-contended VMs than CPU-contended VMs when both exist. That is, response to determining that both a memory-contended VM and a CPU-contended VM exist on the host, VHM 132 selects the memory-contended VM for the shrink event.

At step 610, responsive to determining that resource contention does not exist on a host, and further responsive to determining that there is pending work for a compute cluster, VHM 132 may expand a compute cluster executing on that host. VHM 132 may determine whether there is pending work based on cluster-related metrics indicating there are one or more pending jobs to be performed. VHM 132 may select a VM that is allocated on the un-contended host but in powered-off state. In some embodiments, VHM 132 issues a power on command to virtualization management module 130 to power on and boot the selected VM. In some embodiments, VHM 132 issues a Hadoop command to re-commission the Task Tracker 404 associated with that selected VM, which results in Job Tracker 402 to begin scheduling tasks on that Task Tracker.

In one embodiment, VHM 132 generates at most one decision (e.g., shrink, expand) per host in a given cycle. As described above, a cluster scale strategist associated with each Hadoop cluster 134 makes "selfish" decisions, and an arbitrator of VHM 132 approves or denies each decision based on input from other clusters. In some embodiments, shrink decisions are differentiated from catastrophic-level contention cases. A shrink decision may account for recent shrinks, as a "back-off" mechanism, to allow time for recent shrinks to go into effect themselves. The recency of a shrink decision may be specified in terms of multiples of an action cycle (e.g., occurring within the last two action cycles). VHM 132 may sort VMs 112 based on a degree of resource contention, i.e., from most-contended to least-contended and make shrink decisions based on the sorted list. In one embodiment, an expand decision may also account for recent shrinks or expands.

In one embodiment, VHM 132 may randomize a selection of VMs for expansion to avoid picking faulty VMs repeatedly. In another embodiment, VHM 132 enables "self-healing" clusters by monitoring health of compute nodes to ensure the nodes are functioning correctly. If VHM 132 determines a compute node is faulty, VHM 132 places the compute node on a "grey list," powers off the faulty compute node, powers on another fresh compute node to take its place. In many cases, temporary issues in boot-up and network cause issues for a compute node, so during a subsequent time period, the compute nodes are ready to use. However, if VHM 132 determines that a VM has such issues repeatedly, VHM 132 maintains a record of such issues and may avoid picking the VM for a longer period of time.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for executing a multi-tenant distributed computing application within a virtualized computing environment, the method comprising:
   receiving cluster metrics for each compute cluster in a plurality of compute clusters executing in a virtualized computing environment, wherein each compute cluster includes a workload scheduler and a plurality of worker nodes;
   receiving resource-related metrics associated with performance of the virtualized computing environment, wherein the resource-related metrics comprise at least one of memory related metrics and CPU-related metrics;
   making a determination of whether actual resource contention exists among the plurality of compute clusters for computing resources of a host based on the received cluster metrics and resource-related metrics;
   responsive to making the determination that actual resource contention exists, shrinking at least one of the plurality of compute clusters executing, at least in part, on the host; and
   responsive to making the determination that actual resource contention does not exist on the host, expanding at least one of the plurality of compute clusters executing, at least in part, on the host and having pending work.

2. The method of claim 1, wherein the determination of actual resource contention is made based on an amount of memory reclamation for a virtual machine executing on the host exceeding an amount of unused guest memory for the virtual machine.

3. The method of claim 1, wherein the determination of actual resource contention is made based on CPU ready metrics indicating cycles of time that a virtual machine in the virtualized computing environment was ready but could not get scheduled to run on a physical CPU and based on CPU Overlap metrics that indicate cycles of time a virtual machine in the virtualized computing environment was interrupted to perform system services on behalf of that virtual machine.

4. The method of claim 1, wherein a portion of the resource-related metrics associated with a VM that was powered-on within an initial time period are disregarded from making a determination of whether actual resource contention exists.

5. The method of claim 1, wherein shrinking at least one of the plurality of compute clusters executing, at least in part, on the host further comprises:
   responsive to making the determination that both a memory-contended VM and a CPU-contended VM exist on the host,
   selecting the memory-contended VM.

6. The method of claim 1,
   wherein shrinking at least one of the plurality of compute clusters executing, at least in part, on the host further comprises:
   decommissioning a task tracker node executing on a VM, and
   powering off the VM; and
   wherein expanding at least one of the plurality of compute clusters executing, at least in part, on the host and having pending work further comprises:

powering on a VM executing on the host, and
re-commissioning a task tracker to execute on the VM.

7. The method of claim 1, wherein the determination of actual resource contention is made according to a control-theory-based algorithm based on the received cluster metrics and resource-related metrics.

8. The method of claim 7, further comprising:
receiving a second set of cluster metrics and resource-related metrics; and
making a determination, during a subsequent action cycle, that actual resource contention exists based on the second set of cluster metrics and resource-related metrics and further based on the cluster metrics and resource-related metrics received during a prior action cycle.

9. The method of claim 1, further comprising:
generating one or more moving averages based on the received resource-related metrics associated with performance of the virtualized computing environment; and
discarding a second set of resource-related metrics received during a subsequent action cycle responsive to determining the second set of resource-related metrics are anomalous relative to the moving average.

10. A non-transitory computer readable storage medium having stored thereon computer software executable by a processor, the computer software embodying a method for executing a multi-tenant distributed computing application within a virtualized computing environment, the method comprising:
receiving cluster metrics for each compute cluster in a plurality of compute clusters executing in a virtualized computing environment, wherein each compute cluster includes a workload scheduler and a plurality of worker nodes;
receiving resource-related metrics associated with performance of the virtualized computing environment, wherein the resource-related metrics comprise at least one of memory related metrics and CPU-related metrics;
making a determination of whether actual resource contention exists among the plurality of compute clusters for computing resources of a host based on the received cluster metrics and resource-related metrics;
responsive to making the determination that actual resource contention exists, shrinking at least one of the plurality of compute clusters executing, at least in part, on the host; and
responsive to making the determination that actual resource contention does not exist on the host, expanding at least one of the plurality of compute clusters executing, at least in part, on the host and having pending work.

11. The non-transitory computer readable storage medium of claim 10, wherein the determination of actual resource contention is made based on an amount of memory reclamation for a virtual machine executing on the host exceeding an amount of unused guest memory for the virtual machine.

12. The non-transitory computer readable storage medium of claim 10, wherein the determination of actual resource contention is made based on CPU ready metrics indicating cycles of time that a virtual machine in the virtualized computing environment was ready but could not get scheduled to run on a physical CPU and based on CPU Overlap metrics that indicate cycles of time a virtual machine in the virtualized computing environment was interrupted to perform system services on behalf of that virtual machine.

13. The non-transitory computer readable storage medium of claim 10, wherein a portion of the resource-related metrics associated with a VM that was powered-on within an initial time period are disregarded from making a determination of whether actual resource contention exists.

14. The non-transitory computer readable storage medium of claim 10, wherein shrinking at least one of the plurality of compute clusters executing, at least in part, on the host further comprises:
responsive to making a determination that both a memory-contended VM and a CPU-contended VM exist on the host, selecting the memory-contended VM.

15. The non-transitory computer readable storage medium of claim 10,
wherein shrinking at least one of the plurality of compute clusters executing, at least in part, on the host further comprises:
decommissioning a task tracker node executing on a VM, and powering off the VM; and
wherein expanding at least one of the plurality of compute clusters executing, at least in part, on the host and having pending work further comprises:
powering on a VM executing on the host, and
re-commissioning a task tracker to execute on the VM.

16. The non-transitory computer readable storage medium of claim 10, wherein the determination of actual resource contention is made according to a control-theory-based algorithm based on the received cluster-metrics and resource-related metrics.

17. The non-transitory computer readable storage medium of claim 16, the method further comprising:
receiving a second set of cluster metrics and resource-related metrics; and
making a determination, during a subsequent action cycle, that actual resource contention exists based on the second set of cluster metrics and resource-related metrics and further based on the cluster metrics and resource-related metrics received during a prior action cycle.

18. The non-transitory computer readable storage medium of claim 10, the method further comprising:
generating one or more moving averages based on the received resource-related metrics associated with performance of the virtualized computing environment; and
discarding a second set of resource-related metrics received during a subsequent action cycle responsive to determining the second set of resource-related metrics are anomalous relative to the moving average.

19. A system for executing a distributed computing application within a virtualized computing environment, the host computer system comprising:
a memory device;
a processor coupled to the memory device that contains a program for the processor to carry out the steps of:
receiving cluster metrics for each compute cluster in a plurality of compute clusters executing in a virtualized computing environment, wherein each compute cluster includes a workload scheduler and a plurality of worker nodes;
receiving resource-related metrics associated with performance of the virtualized computing environment, wherein the resource-related metrics comprise at least one of memory-related metrics and CPU-related metrics;

making a determination of whether actual resource contention exists among the plurality of compute clusters for computing resources of a host based on the received cluster metrics and resource-related metrics;

responsive to making the determination that actual resource contention exists, shrinking at least one of the plurality of compute clusters executing, at least in part, on the host; and responsive to making the determination that actual resource contention does not exist on the host, expanding at least one of the plurality of compute clusters executing, at least in part, on the host and having pending work.

20. The system of claim 19, wherein the determination of actual resource contention is made according to a control-theory-based algorithm based on the received cluster-metrics and resource-related metrics.

* * * * *